United States Patent
Rentz (10) Patent No.: US 7,114,408 B2
(45) Date of Patent: Oct. 3, 2006

(54) DROP AWAY LEAF PIVOT UNIT

(75) Inventor: Matthew Rentz, Shelby Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 146 days.

(21) Appl. No.: 10/354,426

(22) Filed: Jan. 30, 2003

(65) Prior Publication Data

US 2004/0149060 A1    Aug. 5, 2004

(51) Int. Cl.
F16H 21/44    (2006.01)

(52) U.S. Cl. .................. 74/99 R; 248/573

(58) Field of Classification Search ............... 74/99 R; 248/560, 564, 573, 636, 638, 648
See application file for complete search history.

(56) References Cited

U.S. PATENT DOCUMENTS

| | | | | |
|---|---|---|---|---|
| 4,272,117 A * | 6/1981 | Vilbeuf | ................ | 296/65.02 |
| 4,666,364 A * | 5/1987 | Doege et al. | ................ | 414/742 |
| 4,822,094 A * | 4/1989 | Oldfather et al. | ........ | 296/65.02 |
| 5,257,680 A * | 11/1993 | Corcoran et al. | ........... | 188/129 |
| 5,701,791 A | 12/1997 | Schulze et al. | ................ | 83/277 |
| 5,762,325 A | 6/1998 | Blatt | ........................ | 269/32 |
| 5,845,897 A | 12/1998 | Tunkers | ................ | 269/32 |
| 6,070,864 A | 6/2000 | Crorey | ................ | 269/32 |
| 6,082,552 A * | 7/2000 | Pollock et al. | ................ | 211/18 |
| 6,092,796 A | 7/2000 | Long et al. | ................ | 269/32 |
| 6,145,778 A | 11/2000 | Tuominen et al. | ........ | 242/541.7 |
| 6,220,588 B1 | 4/2001 | Tunkers | ................ | 269/32 |
| 6,269,958 B1 * | 8/2001 | Pollock et al. | ................ | 211/18 |
| 6,279,887 B1 | 8/2001 | Glasenapp et al. | ........... | 269/32 |
| 6,581,306 B1 * | 6/2003 | DiClementi et al. | ........ | 37/231 |
| 2002/0093131 A1 | 7/2002 | Dugas et al. | ................ | 269/32 |

FOREIGN PATENT DOCUMENTS

JP        56-14636        * 12/1981

* cited by examiner

Primary Examiner—David Fenstermacher
(74) Attorney, Agent, or Firm—Raggio & Dinnin, P.C.

(57) ABSTRACT

A drop away leaf pivot unit for use with a clamp in a manufacturing environment. The drop away leaf pivot unit includes a body having a plurality of orifices therethrough and a chamber defined therein. A base member is connected to the body at one side thereof. The pivot unit includes a cylinder extending from an end of the body with a cylinder having a piston and piston rod therein. A spline shaft is rotatably supported by the body and has a drive link engaged therewith. The drive link is also connected to the piston rod on the opposite end. At least one stop member is engaged with the shaft on an end. The drop away leaf pivot unit also includes an arm secured to the shaft on an outer portion of the shaft, outside of the body of the pivot unit. A cover plate is secured to both ends of the body to ensure an enclosed operating environment for certain components of the pivot unit.

2 Claims, 5 Drawing Sheets

DROP AWAY LEAF PIVOT UNIT

BACKGROUND OF THE INVENTION

1. Field of the Invention

The present invention generally relates to a pivot unit, and more particularly relates to a drop away leaf pivot unit for use with a clamp in a manufacturing assembly line.

2. Description of Related Art

Pivot units have been known for numerous years in the manufacturing assembly line industries. Generally, pivot units are used to pivot a clamp, holding device, tool, or other unit that is performing an operation on a product along an assembly line. The pivot unit generally will pivot the tool or clamp to a predetermined position along the manufacturing line and either hold or perform an operation on a work piece or a product along the assembly line process. Generally, the pivot action is in a circular arc and is performed such that during non-operation of that device the pivot unit will move the clamp or tool into a neutral position away from the manufacturing assembly line. Pivot units also may be used to pivot into position a clamp that will hold a work piece in a proper position along the work line for a specific workstation in the manufacturing assembly line, such as those found in an automotive assembly line.

Many of the prior art pivot units are open architecture and are vulnerable to the contaminates in the operating environment of the manufacturing process. In particular many manufacturing assembly processes include a plurality of welding robots and welding arms used to connect or place pieces into predetermined positions. Many of the robotic arms have weld units at the end thereof and perform welding operations on frames or other units, etc. in the manufacturing environment. When the weld is being placed by the robotic arm unit at the end of the pivot unit weld slag and other materials which are used to prepare the metal and provide for a proper weld is splattered and dropped at various positions along the line and even into the pivot units. This weld slag damages and reduces the operational efficiency and durability of the prior art pivot units in the current manufacturing environments. Furthermore, the prior art pivot units are bulky with complicated designs that include a plurality of rotating pneumatically operated parts designed to move only one part or tool in one predetermined arc along a manufacturing line. Therefore, the prior art pivot units have no flexibility and were designed specifically for one part at one predetermined position along a manufacturing assembly line. Therefore, the costs to design, install and repair are great for these prior art pivot units. Furthermore, the use of the prior art open architecture increases the cost to manufacturers by reducing the durability and reliability of the pivot units because of possible contamination by weld slag and other contaminates found in a robotic manufacturing assembly line. Furthermore, if a design change has to be made to the work piece being built on the manufacturing line a completely new open architecture pivot unit would have to be built thus increasing the costs to the manufacturer. Furthermore, significant design changes would have to be made and numerous parts replaced to retrofit an existing pivot unit having a predetermined stand alone architecture to accommodate any new changes to the assembly line or the work piece being manufactured along the assembly line.

Therefore, there is a need in the art for a new and improved pivot unit that is enclosed such that weld slag and other contaminates of the manufacturing environment will not effect the durability or reliability of the pivot unit. Furthermore, there is a need in the art for a pivot unit that is capable of being adjustable to accommodate various manufacturing lines and pieces or products without having to rebuild a complete unit. Furthermore, there is a need in the art for a low cost pivot unit that is more robust, reliable and easily modified to accommodate numerous changes in a manufacturing environment with a short down time for the manufacturing line.

SUMMARY OF THE INVENTION

One object of the present invention is to provide an improved drop away leaf pivot unit.

Another object of the present invention is to provide a pivot unit for use with clamps in a manufacturing assembly line.

Yet a further object of the present invention is to provide a closed architecture or enclosed pivot unit for use in a manufacturing line.

Still another object of the present invention is to provide a pivot unit that includes a piston rod, and a drive link within the body of a pivot unit.

Still another object of the present invention is to provide a pivot unit that includes shocks and stops enclosed within the body of the pivot unit to protect from weld slag and other contaminates of the manufacturing environment.

Still another object of the present invention is to provide a lightweight and smaller package pivot unit for use in the manufacturing environment.

Yet another object of the present invention is to provide a low cost and adjustable pivot unit for use on a variety of manufacturing lines with a variety of work pieces.

To achieve the fore going objects, a drop away leaf pivot unit according to the present invention is disclosed. The pivot unit includes a body having a plurality of orifices therethrough. A base is secured to the body on an end thereof. The drop away pivot unit also includes a cylinder extending from an end of the body wherein the cylinder has a piston and a piston rod therein. A spline shaft is rotatably supported by the body through two of the orifices. A drive link is engaged with the shaft on one end and connected to the piston rod on an opposite end. A stop member is engaged with the shaft on one end thereof. The pivot unit also includes an arm secured to the shaft on an outside surface of the pivot unit. The pivot unit includes a cover plate connected to the end of the body on each side thereof. The drop away pivot unit has a chamber that defines in part an enclosed body for the pivot unit thus increasing reliability and protecting the internal moving parts of the pivot unit from contaminants found in the manufacturing environment.

One advantage of the present invention is that it provides a new and improved drop away leaf pivot unit.

Still another advantage of the present invention is that the pivot unit has a reduced package size and is lighter in weight.

Still another advantage of the present invention is that the pivot unit includes a closed architecture body having a chamber therein for protecting predetermined parts of the pivot unit from the robotic manufacturing environment contaminants such as weld slag, etc.

Still another advantage of the present invention is that the pivot unit is adjustable to work with or on a variety of work pieces in a variety of manufacturing environments.

It is still another advantage of the present invention that the pivot unit is capable of use with large load power clamps in a manufacturing environment such as that of the automotive industry.

Yet another advantage of the present invention is that the pivot unit can have approximately a five to one or ten to one ratio in the pivot unit.

Yet another advantage of the present invention is that the pivot unit can be used on a variety of manufacturing lines and is adjustable to accommodate different manufacturing lines and or work piece products.

Other objects, features and advantages of the present invention will become apparent from the subsequent description and appended claims, taken in conjunction with the accompanying drawings.

BRIEF DESCRIPTION OF THE DRAWINGS

FIG. 6 shows a detailed view of the spline shaft and connected components according to the present invention.

DESCRIPTION OF THE EMBODIMENT(S)

Referring to the drawings, a drop away leaf pivot unit 10 according to the present invention is shown. The pivot unit 10 is for use on a manufacturing line during the assembly of a work piece or other material handling requirements along a manufacturing line. The pivot unit 10 maybe used in conjunction with a clamp or robot unit to help secure a work piece during a welding action by a robot unit or to transfer a work piece along a manufacturing line at a predetermined speed. The pivot unit 10 is capable of holding and positioning high-powered pneumatic clamps or an entire robot arm in a predetermined position during the manufacturing operation of a work piece. The present invention uses an enclosed architecture for the pivot unit 10 thus protecting the pivot units internal components from contamination during a manufacturing operation on the assembly line. Specifically, the enclosed body 12 is capable of protecting from weld slag contaminating the drive link 14 and stop member 16 of the pivot unit 10 thus increasing the reliability and operational capacity of such components of the pivot unit 10 during the manufacturing operation.

Figure 1:
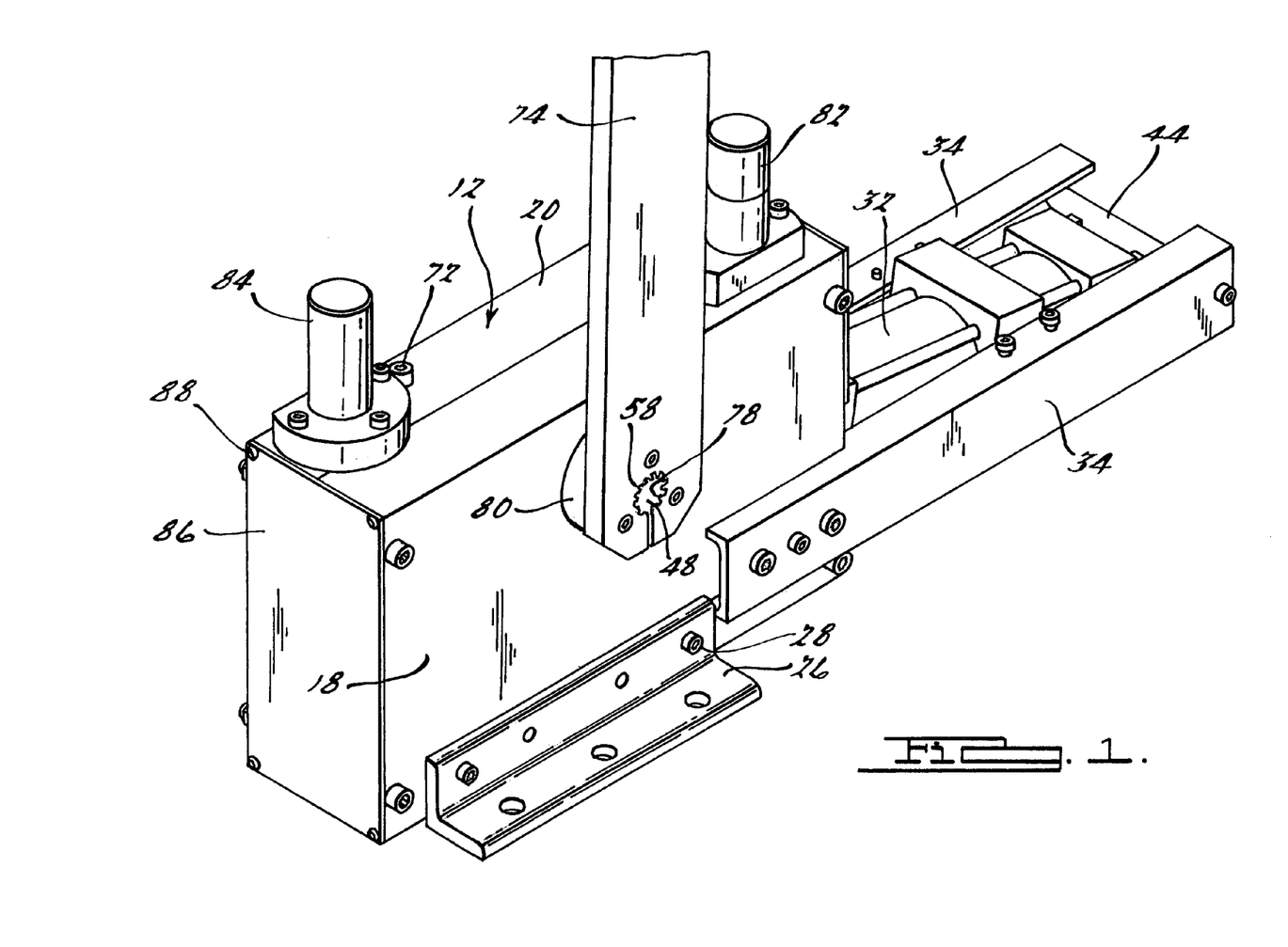
FIG. 1 shows a perspective view of the pivot unit according to the present invention.
Figure 2:
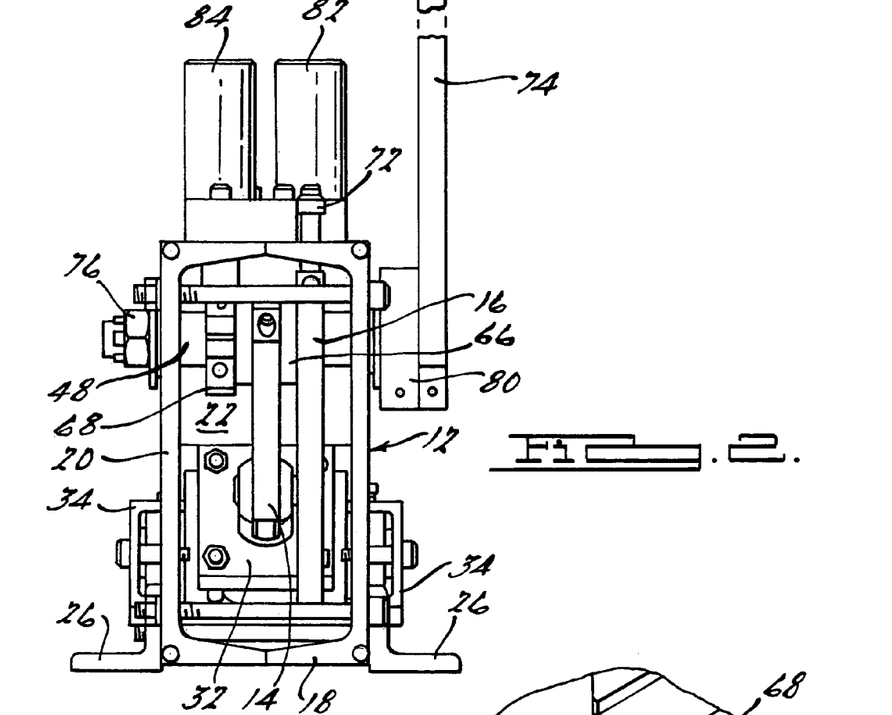
FIG. 2 shows an end view of the pivot unit according to the present invention.
Figure 3:
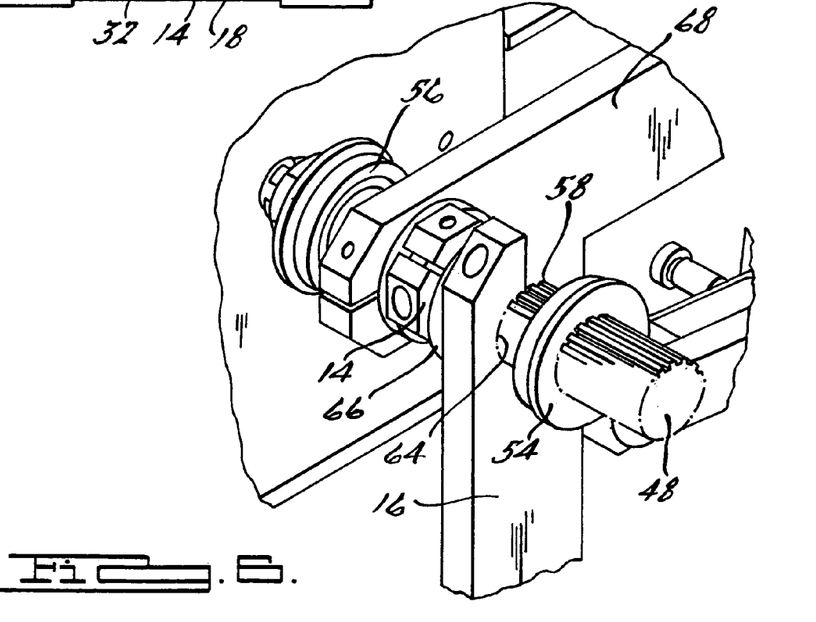
FIG. 3 shows a partial cut away view of the pivot unit according to the present invention from a side view.
Figure 4:
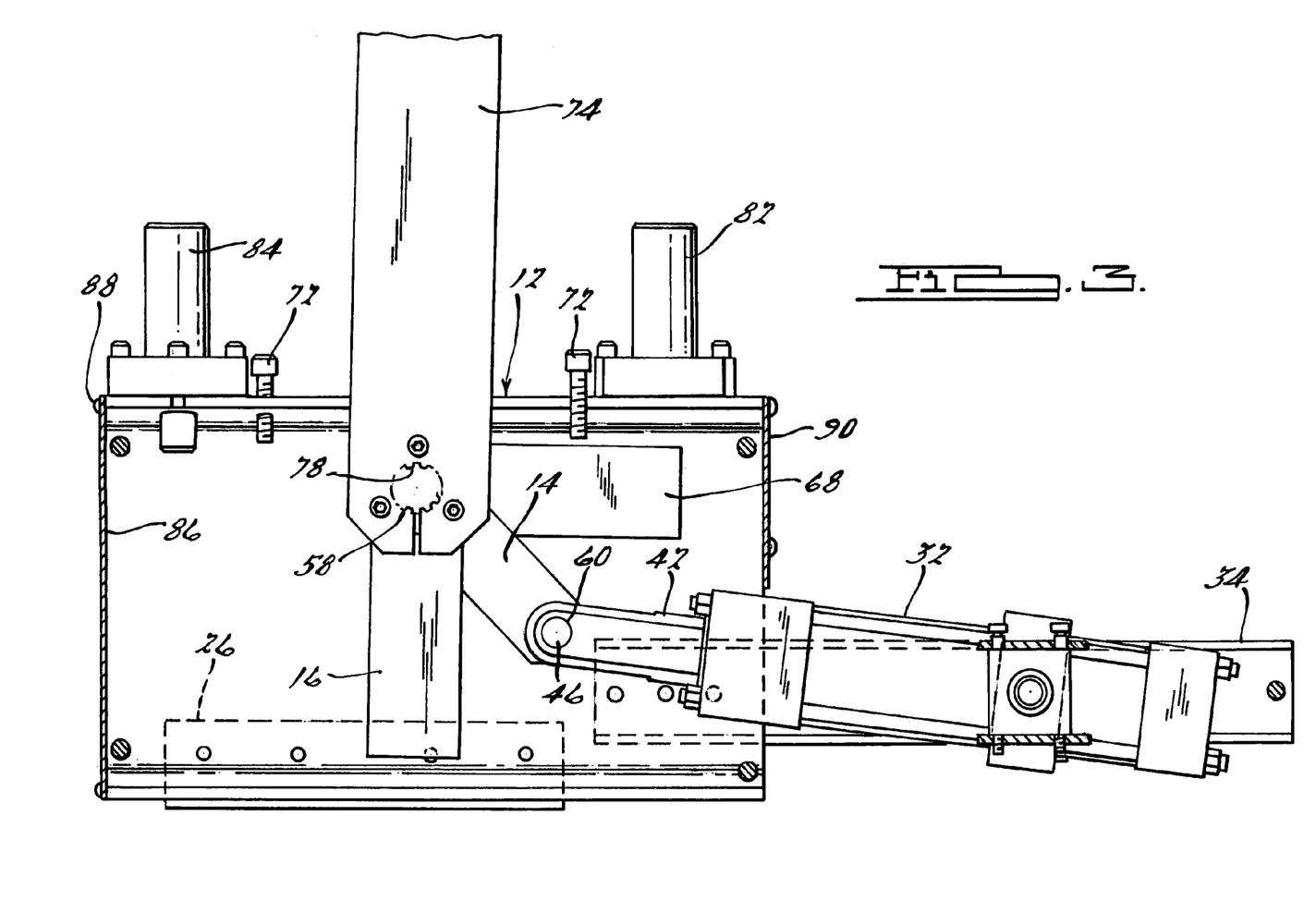
FIG. 4 shows a top view of the pivot unit according to the present invention.
Figure 5:
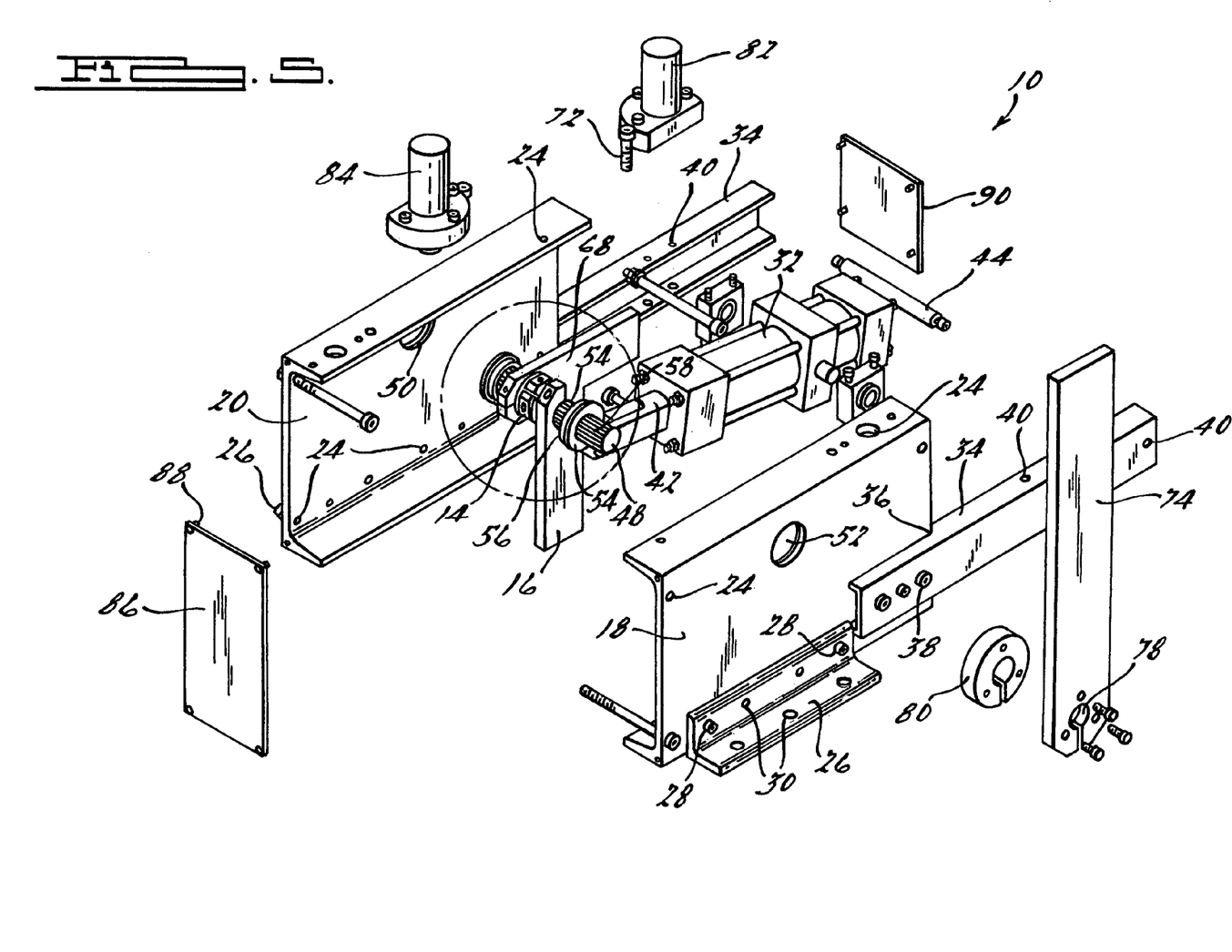
FIG. 5 shows an exploded view of the pivot unit according to the present invention.

FIGS. 1 through 6 show one embodiment of a drop away leaf pivot unit 10 according to the present invention. The pivot unit 10 includes a body 12 generally having a rectangular shape. The body 12 can be one solid piece but in the one embodiment shown it is a two-piece body 12. The two-piece body 12 is formed from a first 18 and second c-channel member 20 which are arranged next to each other such that the body 12 has an interior enclosed chamber 22. It should be noted that in one embodiment the body 12 is made from a steel material, however, it should be noted that any other metal material, plastic, ceramic, composite, or other hard material may also be used for the body 12. The body 12 includes a plurality of orifices 24 through surfaces thereof. The orifices 24 are used to connect the body 12 to a base member 26, to a robot-operating unit, and also for use in connecting other apparatuses to and through the body 12. Generally the orifices 24 are all circular in shape however, any other shaped orifice 24 maybe used depending on the environment and operating needs of the pivot unit 10. As noted above the body 12 may also be formed from one piece of metal stock and machined or cast to specific dimensions but in the embodiment shown the two-piece body 12 is the preferred method for forming the body unit.

A first and a second base member 26 are connected via any known fastener 28 to one or both outer sides of the body 12. The base members 26 generally have an L-shaped cross-section. The base members 26 include a plurality of orifices 30 therethrough for connecting to the side of the body 12 and for connecting to a robot unit or other work unit within the manufacturing environment. In an alternate embodiment envisioned the base members 26 will extend the entire length of the body 12 and extend another predetermined distance beyond the edge of the body 12. This extended base member 26 will allow for support to be provided to a cylinder 32. The first and second body members 26 may be secured to one another via any known fasteners such as a machine screw and nut or any other type of fastener known. It should be noted that in one embodiment the base member 26 is made of a steel material however any other metal, plastic, ceramic, composite or other hard material may also be used depending on the design requirements and manufacturing environment of the pivot unit 10.

Extending from an end of the body 12 is a first and second bar member 34 generally having a c-shaped cross-section. The bar member 34 includes an inward facing step 36 at or near one end thereof for securing to the body 12 through a plurality of orifices through the bar member 34. It should be noted that any type of fastener 38 may be used to secure the bar member 34 to the end of the body 12 including a machine screw or any other type of screw or fastener known. The bar member 34 includes a plurality of orifices 46 for connecting and supporting a cylinder 32 at the opposite end thereof. It should be noted that in an alternate embodiment the bar member 34 may be replaced by a single extended base member. It should also be noted that the bar member 34 may also be designed with various shapes and that the c-shaped cross-section is just one embodiment. Other solid embodiments or straight bars may also be used depending on the design requirements and manufacturing environment of the pivot unit. The bar members 34 are made of steel in the embodiment shown but any other metal, ceramic, plastic, composite, etc., may also be used.

A cylinder 32 extends from an end of the body 12 and is partially arranged within the chamber 22 or the body 12 while the opposite end of the cylinder 32 extends outward from the body 12 in a direction similar to that of the bar members 34. The cylinder 32 includes a piston and a piston rod 42 which are axially slideable there within. The cylinder 32 also includes a plurality of orifices for connecting hoses or lines thereto in order to operate the cylinder 32 within its normal operating parameters. It should be noted that in one embodiment the cylinder 32 is pneumatically operated but that other types of cylinders 32 are also contemplated such as electrical, mechanical, chemical or electro-mechanical depending on the design requirements and manufacturing environment of the pivot unit 10. The cylinder 32 generally will operate by introducing air at one end and releasing air on an opposite end of the cylinder 32 thus moving a piston and hence the piston rod 42 in an axial direction either towards or away from an end of the body of the pivot unit 10 within the cylindrical bore of the cylinder 32. The piston rod 42 extends from an end of the cylinder 32 and is enclosed within the body 12 of the pivot unit 10. Therefore, the piston rod 42 will move in an axial direction along the lengthwise axis of the body 12 within the enclosed chamber 22. The cylinder 32 is supported by the bar member 34 via one of the orifices 40 near the end of the bar members 34. Any known securing fastener member is used to secure the bar member 34 to the cylinder 32. It should further be noted that a fastener 44 is used to secure the bar members 34 to one another at an end thereof to provide increased strength and rigidity to the bar members 34. A clevis bracket 46 is arranged on an end of the piston rod 42 that extends within the body 12 of the pivot unit 10. The clevis 46 includes an orifice aligned through both ends thereof. The clevis 46 is connected to the piston rod 42 by any known means such as a fastener, interference fit or any other mechanical, chemical means of connecting. It should be noted that the end of the piston rod 42 maybe used without the clevis bracket 46.

A spline shaft 48 is rotatably supported within a first 50 and second support orifice 52 of the body 12. The spline shaft 48 is arranged such that it extends through the inner chamber 22 of the body 12. The spline shaft 48 extends at a predetermined distance out of each side of the body 12 depending on the design and the manufacturing environment packaging requirements. A dust cover 54 is arranged around a tapered bearing 56 which is inserted in each support orifice 50, 52 on a side surface of the body 12. The spline shaft 48 is then arranged within the tapered bearings 56 on each end thereof. The tapered bearings 56 will allow for the spline shaft 48 to rotate with respect to the body 12 of the pivot unit 10. The spline shaft 48 includes a plurality of splines 58 along an entire axial length thereof. The splines 58 have a predetermined amount of distance therebetween and a predetermined number of splines 58 on the outer surface of the shaft 48. In one embodiment the spline 48 has twenty-four teeth or splines. The twenty-four toothed spline shaft allows the designers to use 15° increments of rotation per tooth. This allows for a pivot unit 10 that is capable of being used through all the degrees of rotation with nearly zero part variances while also decreasing the complexity of assembling the pivot unit 10. It should also be noted that in another contemplated embodiment a twenty toothed spline shaft could be used. A twenty tooth shaft yields 18° of rotation per tooth. It is generally accepted in the industry that 15° of rotation per tooth is desired, but by positioning the links in predetermined positions a twenty tooth shaft can be changed to the more desirable 15° of rotation. However, any number of degrees, ie. 0° to 360°, of rotation per tooth can be designed or used and the twenty and twenty four tooth shafts are just two examples contemplated. It should be noted that the shaft 48 is circular and has a cylindrical like shape in one embodiment however any other shaped spline shaft 48 such as an ellipse, octagon, etc., may also be used for the pivot unit 10 as described. The spline shaft 48 will provide a plurality of connection options between the spline shaft 48 and the internal parts of the pivot unit 10. This will allow for complete flexibility in the size of the radial arc movement of the pivot unit 10. It should be noted that the spline shaft 48 is generally made of a steel material however any other metal, ceramic, plastic, composite or any other known hard material capable of having a spline applied to a outer surface thereof may also be used. It should be noted that different varieties of the spline shaft 48 maybe used having different ratios of splines, different sized splines, different length and diameter shaft, etc.

A drive link 14 is arranged within the chamber 22 of the body 12. The drive link member 14 generally has a rectangular shape with a circular orifice 60 on one end and a splined circular orifice 62 on an end opposite thereof. It should be noted that the splined orifice 62 may be a smooth inner surface orifice depending on the design requirements and the work environment of the pivot unit 10. The circular orifice 60 is connected to the end of the piston rod 42 that extends within the chamber 22 of the body 12 via any known fastener. The end of the drive link 14 having the orifice 62 has a matching and mating splined inner surface which is aligned onto the spline shaft 48 and secured thereon. The angle that the drive link 14 has with respect to the splined shaft 48 is predetermined and will determine the amount of rotational movement available for the pivot unit 10. Any known fastener is used to secure the spline shaft 48 to the end of the drive link 14.

A first stop member 16 generally has a rectangular shape. The stop member 16 includes an orifice 64 on one end thereof that in one embodiment is splined to match with the splines of the outer surface of the spline shaft 48. However, it should be noted that a smooth inner surface may also be used for the orifice of the stop member 16 depending on the design requirements and environment of the pivot unit 10. The stop member 16 is arranged adjacent to the drive link 14. In one embodiment as shown in the figures a spacer 66 is placed between the first stop member 16 and the drive link 14. The first stop member 16 has a predetermined angle between itself and the drive link 14. The pivot unit 10 may also include, as shown in the figures, a second stop member 68 which generally has a rectangular shape and an orifice 70 at one end thereof. The orifice 70 may be splined to match that of the spline shaft 48 or may be smooth depending on the design requirements of the pivot unit 10. The second stop member 68 is arranged adjacent to the drive link 14 on the side of the drive link 14 opposite to that of the first stop member 16. In the embodiment shown the spacer 66 is placed between the drive link 14 and the second stop member 68. It should be noted that the stop members 16, 68 may be placed directly on the spline shaft 48 without the spacers 66 therebetween. The second stop member 68 is fastened with any known fastener to the spline shaft 48 via the orifice 70 on the end thereof. The second stop member 68 is arranged on the spline shaft 48 at a predetermined angle to both the first stop member 16 and the drive link 14. The stop members 16, 68 will be arranged such that in a fully open or extended position the pivot unit 10 will have one of the stop members engage a block member 72 within the inner chamber 22 of the base 12 of the pivot unit 10. When the pivot unit 10 is in the fully closed or retracted position the second or other stop member will engage with a second block 72 extending into the enclosed body 12 of the pivot unit 10. It should be noted that the stop members 16, 68 and the drive link 14 are all tunable and adjustable to allow for any amount of pivot in the pivot unit arm 74 along an arc in a range from 0 to 180°. Therefore, the drive link member 14 is arranged between the first 16 and second stop member 68 on the spline shaft 48 of the pivot unit 10.

On one end of the spline shaft 48 is located a threaded portion which is used to connect and secure the shaft 48 to the side of the body 12 via any known fastener 78 such as a castle nut etc. This will support the spline shaft 48 on one end thereof. It should be noted that the spline shaft 48 is a solid member and that along with the stop members 16, 68 and the drive link 14 are all made of a steel material however it should be noted that any metal, ceramic, hard plastic, composite may also be used to design these parts depending on the design requirements and operating atmosphere of the pivot unit 10.

On the end opposite of the castle nut 76 of the spline shaft 48, which extends from the side of the body 12, is located an arm 74. The arm 74 generally has a rectangular shape and is capable of pivoting any where between 0 and 180° with respect to the body 12 of the pivot unit 10. The arm 74 is connected to the outer end of the spline shaft 48 via an orifice 78 that has a plurality of splines that mate with and align with and are secured to the splines on the spline shaft 48. In one embodiment as shown an arm stabilizer 80 generally having a ring like shape is placed between the body 12 and/or dust cover 54 and the inside surface of the arm 74. This will provide for stabilization and increase the robustness and strength of the arm 74 with respect to the pivot unit body 12. It should further be noted that a plurality of orifices are located through the arm 74 for connecting a heavy-duty pneumatic clamp or other operating tool in the work environment thereto. The arm 74 is made in one embodiment of a steel material however any other known metal, ceramic, plastic, composite or other material may be used depending on the design requirements and environment of the pivot unit 10. The arm 74 will rotate in an arc to move a clamp to a clamping position for the work piece or the tool being held thereon into a proper operating position in the manufacturing environment. When the operation is done on the work piece the pivot unit arm 74 will swing the clamp or tool back to a neutral position out of the way of other robotic tools in the operating environment.

In the embodiment shown a first 82 and second shock absorber member 84 are connected to a topside of the body 12 with one each being connected to each one half of the body 12. The shock absorber 82, 84 has a portion extending out from the surface of the body 12 while another part of the shock absorber 82, 84 extends internally into the chamber 22 of the body 12. The shock absorber 82, 84 will be used to soften the landing of the pivot arm 74 when it gets to its fully engaged or fully retracted position. Directly adjacent to each of the shock absorbers 82, 84 is a block member 72 which will extend outward from a top surface of the body 12 a predetermined distance and into the internal chamber 22 of the pivot unit 10 a predetermined distance. The block members 72 in one embodiment may be any sort of fastener but any other pole, post or hard object may be used as the block member 72. The block member 72 will define the fully open and fully retracted position of the pivot arm 74 in the pivot unit 10. This will allow the pivot unit 10 to be precisely adjusted such that when one of the stop members 16, 68 engages a block member 72 the pivot unit 10 will be in its fully extended position thus allowing for an operation on the work piece to be completed and the when the pivot unit arm 74 is moved into its fully retracted position the other stop member 16, 68 will engage with the second block member 72 thus indicating to operators of the robotic environment that the pivot unit 10 is in its fully retracted position. As noted the shock absorbers 82, 84 will in a safe and precise manner soften the landing of the pivot arm 74 to its fully retracted or fully open position.

A cover plate 86 generally having a rectangular shape is connected to the end of the body 12 of the pivot unit 10 opposite that of the cylinder 32. Any known fastener 88 such as a setscrew, machine screw, etc. may be used to connect the cover plate 86 to the end of the body 12. On the opposite end thereof a second cover plate 90 generally having a square or rectangular shape is connected to the top portion of the body 12 of the pivot unit 10 directly above and adjacent to the cylinder 32 which extends into the chamber 22 of the body 12. Hence, the body 12 has enclosed therein the moving parts of the pivot unit 10 including the shock absorbers 82, 84, the block members 72, the first 16 and second stop members 68, the drive link 14, the piston rod 42 and clevis 46 which moves the drive link 14 into its predetermined positions. The closed architecture 12 enclosed body will ensure that weld slag and other containments do not contaminate the important moving parts of the pivot unit 10. It should be noted that the unit is not hermetically sealed to prevent the ingress of any air or other gaseous substances. However it is contemplated to hermetically seal around the cylinder 32 to create a perfectly sealed environment for the pivot unit 10 if operating parameters and design requirements need a perfect seal. It should be noted that the cover plates 86, 88 are generally made of a steel material however any other metal, ceramic, hard plastic, composite may also be used for the cover plates 86, 88 in the pivot unit 10.

In operation the pivot unit 10 is connected to a robot or other working machine at a predetermined position. Then a clamp or work tool is connected to the pivot arm 74 of the pivot unit 10. When in its neutral or non-use position the first stop member 16 will be engaged with a first block member 72. When the pivot arm 74 is needed for its operation, such as the clamp or robotic tool connected to the end thereof, pneumatic air will be introduced to the cylinder 32 such that the piston rod 42 will move in an axial direction towards the inner part of the chamber 22 of the body 12. This will move the drive link 14 in a clockwise direction thus rotating the spline shaft 48 in a clockwise direction. Hence, the second stop member 68 will also rotate in a clockwise direction in a circular arc until it engages the shock absorber 82 and second block member 72. When the stop member 68 engages the second block member 72 the pivot unit 10 will be in its fully open position and the clamp on the end of the pivot arm 74 can clamp down the work piece it is holding or perform the operation it is to perform on the work piece. Then air is introduced in a reverse manner to the cylinder 32 such that the piston will move in the opposite axial direction and the piston rod 42 will move towards the outer edge of the body 12. This will move the drive link 14 in a counterclockwise direction along with the first 16 and second stop members 68 until the first stop member 16 engages with the first shock absorber 84 and the first block member 72. This will ensure that the pivot unit 10 is in its neutral position away from the work piece as it moves down the assembly line. It should be noted that a cylinder lock may be incorporated into the cylinder 32 to ensure that the pivot arm 74 stays in its fully open or fully retracted position.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. A pivot unit for use in a manufacturing assembly line, said pivot unit including:
    a two piece body having a plurality of orifices through a surface, said body having a chamber defined therein;
    a base connected to said body;
    a cylinder extending from an end of said body, said cylinder having a piston and a piston rod therein;
    a clevis attached to an end of said piston rod within said chamber of said body;
    a splined shaft rotatably supported by said body;
    a drive link arranged within said chamber, said drive link having an orifice, said drive link engaged with said shaft;

a first and a second stop member arranged within said chamber, said stop members engaged with said shaft, said first and second stop member having a predetermined angle therebetween;

at least one shock absorber arranged within said chamber;

at least one block member arranged within said chamber;

an arm adjacent to said body, said arm engaged with said shaft, said splined shaft having a plurality of splines with a predetermined distance between said splines to allow for a predetermined number of degrees of rotation for said arm; and a cover plate secured to an end of said body.

2. The pivot unit of claim 1 further including a bar member extending from an end of said body.

* * * * *